United States Patent [19]

Teindas

[11] Patent Number: 5,442,833
[45] Date of Patent: Aug. 22, 1995

[54] SCREEN WIPER HAVING ARTICULATED ELEMENTS

[75] Inventor: Jean-Louis Teindas, Lezoux, France

[73] Assignee: Valeo Systemes D'Essuyage, Montigny-Le-Bretonneux, France

[21] Appl. No.: 266,010

[22] Filed: Jun. 27, 1994

[30] Foreign Application Priority Data

Jul. 1, 1993 [FR] France .................. 93 08065

[51] Int. Cl.⁶ .......................... B60S 1/38; B60S 1/40
[52] U.S. Cl. .................................. 15/250.31; 403/79
[58] Field of Search ............ 15/250.42, 250.41, 250.31, 15/250.36; 403/24, 79, 363, 224, 145

[56] References Cited

U.S. PATENT DOCUMENTS

| | | | |
|---|---|---|---|
| 3,864,783 | 2/1975 | Arman | 15/250.42 |
| 4,788,736 | 12/1988 | Arai et al. | 15/250.42 |
| 4,909,653 | 3/1990 | Biggs | 15/250.36 |
| 5,183,352 | 2/1993 | Carpenter | 15/250.42 |

FOREIGN PATENT DOCUMENTS

| | | | |
|---|---|---|---|
| 9009300 | 8/1990 | WIPO . | |
| 0286231 | 12/1988 | European Pat. Off. . | |
| 2415563 | 8/1979 | France . | |
| 2443949 | 7/1980 | France . | |
| 2202899 | 10/1988 | United Kingdom | 15/250.42 |
| 2203936 | 11/1988 | United Kingdom | 15/250.42 |

Primary Examiner—Gary K. Graham
Attorney, Agent, or Firm—Morgan & Finnegan

[57] ABSTRACT

A screen wiper, especially a motor vehicle windshield wiper, comprises a first element having a U-shaped cross section and a second element received in the U-shaped cross section of the first element, together with an insert piece which is interposed between the first and second elements. The insert piece has side walls which are formed with annular locating bushes. One of the two elements between which the insert piece is interposed has a hole formed through its side walls, this hole being open to a terminal edge of the side wall through an aperture or slot.

7 Claims, 1 Drawing Sheet

SCREEN WIPER HAVING ARTICULATED ELEMENTS

FIELD OF THE INVENTION

The present invention relates to a screen wiper, in particular though not exclusively a windshield wiper for a motor vehicle, of the type comprising a wiper blade which comprises a wiping strip carried by a carrying structure which consists generally of a swinging linkage, with this linkage comprising a first element having a channel portion of generally U-shaped cross section, a second element which is received in the U-shaped channel portion of the first element, and an insert piece which is interposed between the said first and second elements and which is formed with side walls, each of which is provided with at least one hollow locating spigot in the form of a bush.

BACKGROUND OF THE INVENTION

French patent specification No. 2415563 discloses an arrangement of a screen wiper in which the bushes of the insert piece are fitted in bores or holes which are formed in each of the said first and second elements.

The specification of French published patent application FR 2443949A discloses another arrangement of a screen wiper in which, in order that the insert piece can be arranged between the U-shaped channel portion of the first element and a corresponding U-shaped channel portion of the second element, it is arranged that two of the bushes, which constitute inner bushes, are first fitted into the bores or holes which are formed in the second element, and the side walls of the first element are then moved apart in such a way that the other, or outer bushes of the insert piece can then penetrate into the holes or bores which are formed in the side walls of the first element.

This latter arrangement involves some complication in the operation of fitting the two elements, because it is necessary to increase the distance between the two side walls of the first element, and then to bring the two walls into a desired spaced relationship. In addition, during this operation, it can happen that the two side walls will be taken beyond the desired spacing, which can result in an undesirable deformation of the insert piece. This is detrimental to proper subsequent operation of the articulation between the first and second elements of the swinging linkage.

DISCUSSION OF THE INVENTION

An object of the present invention is to overcome the above mentioned drawbacks, and in particular to facilitate the assembly of the various elements of the screen wiper and to avoid any possibility of components becoming deformed during the fitting of the insert piece.

More particularly, according to the invention, a screen wiper, especially for a motor vehicle, which includes a swinging linkage comprising a first element having a U-shaped cross section and a second element received in the U-shaped cross section of the first element, with an insert piece being interposed between the said first and second elements, the insert piece having side walls which are interposed between the side walls of the said first and second elements, and which carries at least one locating spigot in the form of a bush on each of its side walls, is characterised in that one of the said first and second elements has on each of its side walls a bore or through hole which is open into one of the free ends of the said wall through an aperture extending from the said hole to the said free end.

The invention removes the need to deform the first U-shaped element by forcing its side walls apart. Instead, it is sufficient to fit the bushes of the insert piece into the said aperture, so that the bushes become lodged in the bores or holes which are provided in the walls of the first U-shaped element of the linkage.

According to another feature of the invention, the intersection between the said hole and aperture of each side wall of the said element has a width which is smaller than the outer diameter of the associated bush. This ensures that the insert piece is immobilised in the first U-shaped element of the linkage.

According to a further feature of the invention, the bushes are made of a resiliently deformable material. This enables fitting of the bushes in the associated holes to be carried out in a simple manner.

According to yet another feature of the invention, the insert piece is formed with a projecting element, the shape of which corresponds to that of the said aperture. This ensures that the insert piece is prevented from rotating with respect to the element of the linkage that carries it.

According to yet a further feature of the invention, the screen wiper further includes a rigid pivot pin which passes through all of the bushes. This makes it impossible to lift the insert piece with respect to the first element of the linkage, because the pivot pin then prevents any deformation of the bushes from taking place.

According to another feature of the invention, the said apertures are divergent in the direction going from the associated holes through the side wall of the said element of the linkage, towards a terminal edge at the free end of the latter. Thus, where the junction between the said hole and this divergent aperture is narrower (as mentioned above) than the outer diameter of the associated bush, and therefore narrower than the diameter of the hole itself, the hole and aperture together define a keyhole-shaped slot which facilitates the fitting of the bush in the said first element of the linkage.

Further features and advantages of the invention will appear more clearly on the reading of the detailed description which follows, of a preferred embodiment of the invention, being given by way of example only and with reference to the accompanying drawings.

DESCRIPTION OF A PREFERRED EMBODIMENT OF THE INVENTION

Figure 1:
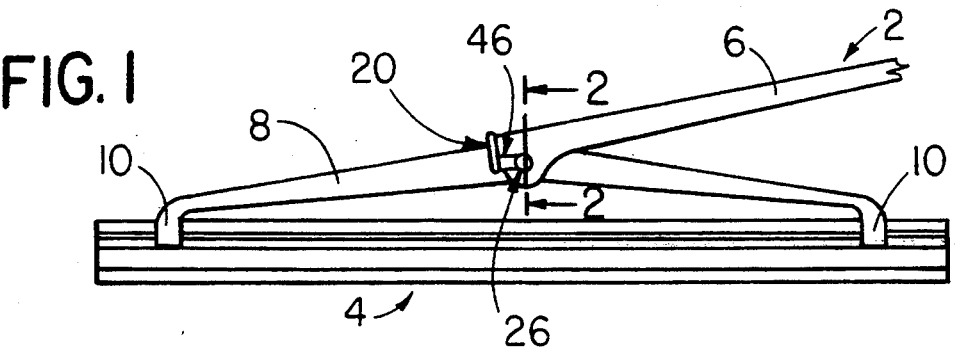
FIG. 1 is a front view of a windshield wiper in accordance with the present invention.
Figure 2:
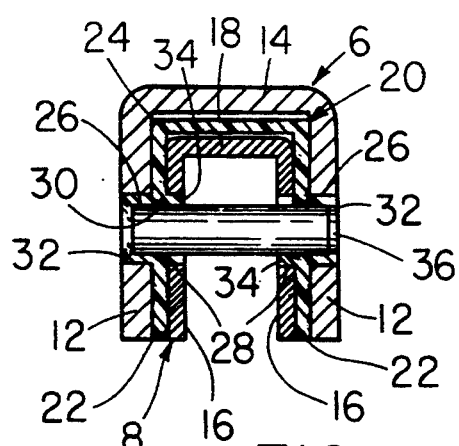
FIG. 2 is a view in cross section taken on the line 2—2 in FIG. 1.

Reference is first made to FIGS. 1 and 2, which show a windshield wiper which includes a wiper blade comprising a carrying structure 2 for carrying a wiping strip 4. The carrying structure 2 consists of a swinging linkage which, in the example described here and shown in the drawing, comprises a first element 6 in the form of a main yoke, and a second element 8 in the form of a secondary yoke. The secondary yoke 8 is provided with claws 10 at its free ends, for carrying the wiping strip 4.

As is best seen in FIG. 2, the main yoke 6 has a channel-shaped end portion with a cross section in the form of an inverted U, with two side walls 12 which are joined by a back portion 14 substantially at right angles to the side walls 12. The secondary yoke 8 comprises a channel section which also has a cross section in the form of an inverted U, with two side walls 16 and a back portion 18. As is best seen in FIG. 2, the secondary yoke 8 is arranged to be received within the U-shaped channel of the main yoke 6, with an insert piece 20 being interposed between the two yokes. The insert piece 20 is commonly referred to a damping or anti-noise piece, and it has, again, a cross section in the form of an inverted U, with side walls 22 and a back portion 24. The side walls 22 of the insert piece 20 are interposed between the side walls 12 and 16 of the two yokes, while its back portion 24 is interposed between the back portions 14 and 18 of the yokes. Still as shown in FIG. 2, the side walls 12 and 16 of the yokes 6 and 8 respectively are formed with through holes 26 and 28 respectively, which are aligned with each other when the two yokes are assembled together.

In addition, each side wall 22 of the insert piece 20 is formed with a hole 30 which is extended by two annular bushes 32 and 34 respectively. The holes 30 constitute a bore of the insert piece. The annular bushes 32 are referred to as outer annular bushes, while the annular bushes 34 are referred to as inner annular bushes. The internal diameter of the bushes 32 and 34 being that of the bore 30, the outer diameter of the bushes 32 is equal to the diameter of the holes 26 in the main yoke 6, while the outer diameter of the inner bushes 34 is equal to the diameter of the holes 28 in the secondary yoke 8. In addition, a pivot pin 36 is arranged to provide articulation between the main yoke 6 and the secondary yoke 8, this pivot pin 36 passing through the bore 30 so as to be lodged within the annular bushes 32 and 34 as shown in FIG. 2.

Figure 4:
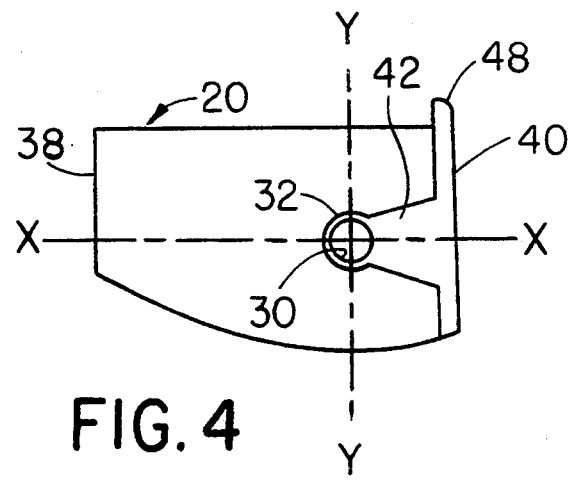
FIG. 4 is a front view of the portion of the windshield wiper shown in FIG. 2, ie. a view as seen from the right hand side of FIG. 2.
Figure 3:
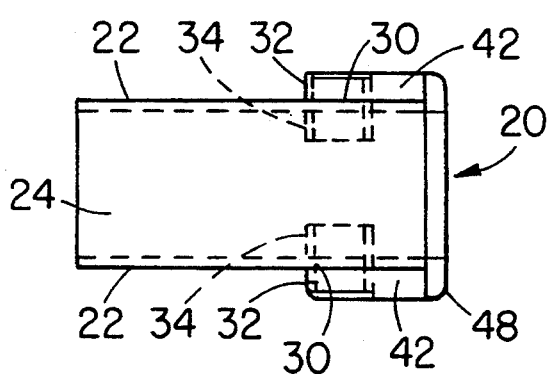
FIG. 3 is a view in elevation of the insert piece used for the present invention.

With reference now to FIGS. 3 and 4, which show in greater detail the construction of the insert piece 20, the back portion 24 of the latter is extended, substantially at right angles, by the two side walls 22. With reference to the horizontal axis XX indicated in FIG. 4, the back portion 24 and side walls 22 terminate in a rear edge 38 which is substantially at right angles to the axis XX, and, at the other end, they terminate in a front edge 40 which is again substantially at right angles to the axis XX. As has already been mentioned, the side walls 22 of the insert piece 20 are formed with the bore 30, which extends to the outside of the side walls 22 through the outer annular bushes 32, and inwardly of the U-shaped cross section of the insert piece through the inner annular bushes 34.

The outer annular bushes 32 are extended in a substantially horizontal direction, i.e. in the direction corresponding to the axis XX, by a projecting element 42 which starts at the bush 32 and terminates at the front edge 40. As shown, the projecting element 42 is in the form of an isosceles trapezium, the major base of which is coincident with the front edge 40, while its minor base joins the outer annular bush 32, so as thus to define inclined sides of the element 42, which thus forms an extension of the outer annular bush 32 concerned up to the front edge 40.

Figure 5:
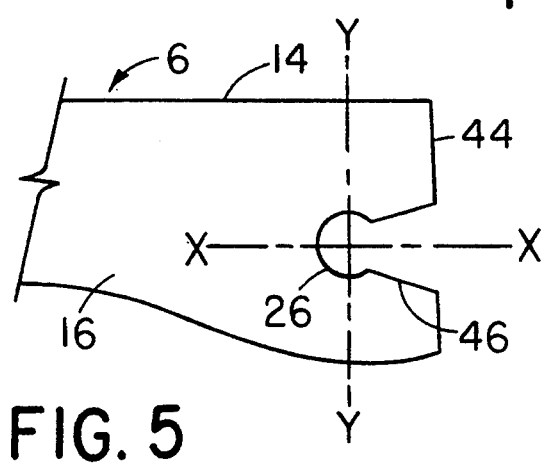
FIG. 5 is a scrap view showing one of the elements necessary for the present invention.

Referring now to FIG. 5, one of the two elements constituting the windshield wiper, this element constituting in this example the main yoke 6, has the back portion 14, and two wings (constituted by the side walls 12 of the yoke) substantially at right angles to the back portion 14. As already described above, the side walls 12 are formed with the holes 26, which are spaced back from the terminal edge 44 at the tree end of the yoke 6.

Each side wall 12 of the yoke 6 has an aperture 46 in the form of a slot, the shape of which is complementary to that of the projecting element 42 of the insert piece 20. More precisely, this slot 46 is in the form of an isosceles trapezium, the major base of which is open in the terminal edge 44 of the yoke, with the minor base of the trapezium defining the junction of the slot 46 with the hole 26 in the respective side wall 12. The intersection between the hole 26 and the slot 46 is such that the width at this intersection is smaller than the outer diameter of the outer bushes 32. Thus there is defined, in each of the side walls of the main yoke 6, a substantially keyhole-shaped slot defined by the hole 26 and slot 46 together.

Figure 6:
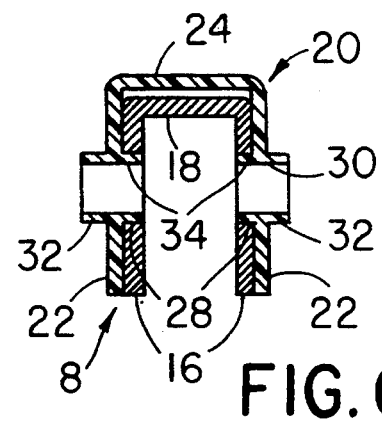
FIG. 6 is a partial view in cross section showing the arrangement of two components of the windshield wiper of the present invention.

Referring now also to FIG. 6, in order to achieve the assembly which gives the arrangement in accordance with the invention, it is arranged that the insert piece 20, which is made of elastically deformable plastics material, is fitted on the secondary yoke 8 as follows. The insert piece 20 is fitted over the yoke 8 so as to straddle it, and the inner annular bushes 34 are then slid along the side walls 16 of the secondary yoke, until the inner bushes 34 are received in the holes 28 formed in the walls 16.

Once this has been done, it is only necessary to bring the outer annular bushes 32 into cooperation with the inclined edges of the slot 46 in the side walls 12 of the main yoke 6, until, with deformation of the shape of the outer annular bushes 32, the bushes 32 reach the junctions between the holes 26 and slots 46 (which junctions, as mentioned above, are shorter in length than the diameter of the bushes). These bushes become elastically deformed in the junction between the holes 26 and slots 46, after which they regain their initial shape within the holes 26.

In this position, the projecting elements 42 of the insert piece 20 cooperate with the slots 46 of the main yoke 6. More precisely, the inclined edges of each projecting element 42 bear on the inclined edges of the associated slot 46. The front edge 40 is formed with a bead 48, the height of which corresponds substantially to the height of the projecting elements 42, and which extends along the U-shaped cross section of the insert piece 20. The rear face of this bead 48 then abuts against the terminal end 44 of the main yoke 6. Thus, the insert piece 20 is prevented from performing any linear movement, because of the cooperation between the outer bushes 32 and the holes 26 associated with them, with possible contact of the bead 48 with the terminal edge 44. The insert piece 20 is prevented from rotating by the cooperation between the slots 46 and the projecting elements 42.

Once these assembly operations have been carried out, and with reference now once again to FIG. 2, the pivot pin 36 is now slid into the bores 30 of the insert piece 20. An essential function of the pivot pin 30 is to prevent the outer annular bushes 32 from becoming deformed in the event of any unwanted manoeuvre of the assembly as a whole.

The arrangements described above constitute a very simple assembly of the various elements which constitute a windshield wiper, this assembly being achieved by simple clipping or snap fitting of the insert piece 20 onto the main yoke.

The present invention is of course not limited to the embodiment described above, but embraces any variant. In particular, although the above description describes a windscreen wiper which comprises a main yoke and a secondary yoke, other arrangements can be conceived, in particular those of the kind in which it is necessary to incorporate a further component or components between the main yoke and a secondary yoke. The secondary yoke may also carry a system of further yokes at its free ends.

Similarly, the embodiment described above has its projecting elements 42 and slots 46 extending substantially horizontally on the axis XX in FIG. 4, but it is possible to adopt any other orientation, and in particular that which is indicated in FIGS. 4 and 5 at YY, that is to say a vertical orientation in which the projecting elements 42 and the corresponding slots 46 are vertical.

What is claimed is:

1. A screen wiper, having a wiping strip and a swinging linkage carrying said wiping strip, the linkage comprising a first elongated element defining a longitudinal axis and defining a channel portion of a U-shaped transverse cross section, a second element received in said channel portion, with each of said first and second elements having a respective pair of longitudinally extending side walls, said first elongated element having an end which is defined by a terminal edge, said edge lying in a plane perpendicular to said longitudinal axis, each of said first and second elements having a pair of aligned holes formed within said side wall 5, said first element side walls further having slots joining said respective holes to said associated terminal edge, and an insert piece interposed between said first and second elements, the insert piece having side walls interposed between the side walls of the first element and those of the second element, the insert piece further having annular locating bushes protruding from its side walls, wherein said side wall holes each receive, respectively, an insert piece locating bush.

2. A screen wiper according to claim 1, wherein each side wall of said first element defines an intersection between the hole and said respective slot, said slot having a width at said respective hole that is smaller than the associated annular bush of the insert piece.

3. A screen wiper according to claim 1, wherein said annular bushes are made of an elastically deformable material.

4. A screen wiper according to claim 1, wherein each said slot in said first element side walls diverge from said hole to said associated terminal edge.

5. A screen wiper according to claim 1, further including a pivot pin extending through all said bushes.

6. A screen wiper having a wiping strip and a swinging linkage carrying said wiping strip, the linkage comprising a first elongated element defining a longitudinal axis and defining a channel portion of a U-shaped transverse cross section, a second element received in said channel portion, with each of the said first and second elements having a respective pair of longitudinally extending side walls, said first elongated element having an end which is defined by a terminal edge, said edge being perpendicular to said longitudinal axis, each of said first and second elements having a pair aligned holes formed within said side walls, said first element side walls further having slots joining said respective holes to said associated terminal edge, and an insert piece interposed between said first and second elements, the insert piece having side walls interposed between the side walls of the first element and those of the second element, the insert piece further having annular locating bushes protruding from its side walls, wherein said side wall holes each receive, respectively, an insert piece locating bush, wherein the insert piece is formed with a projecting element having a shape corresponding to that of said slot and being received in said slot to stabilize the linkage.

7. A screen wiper according to claim 6, wherein said projecting element extends from the associated annular bush to a terminal edge of the insert piece.

* * * * *